US009852188B2

(12) United States Patent
Bakir et al.

(10) Patent No.: US 9,852,188 B2
(45) Date of Patent: Dec. 26, 2017

(54) CONTEXTUAL SEARCH ON MULTIMEDIA CONTENT

(71) Applicant: Google Inc., Mountain View, CA (US)

(72) Inventors: Gökhan Hasan Bakir, Zürich (CH);
Károly Csalogány, Zürich (CH);
Behshad Behzadi, Zürich (CH)

(73) Assignee: GOOGLE LLC, Mountain View, CA (US)

(*) Notice: Subject to any disclaimer, the term of this patent is extended or adjusted under 35 U.S.C. 154(b) by 276 days.

(21) Appl. No.: 14/312,630

(22) Filed: Jun. 23, 2014

(65) Prior Publication Data
US 2015/0370859 A1 Dec. 24, 2015

(51) Int. Cl.
G06F 7/00 (2006.01)
G06F 17/30 (2006.01)

(52) U.S. Cl.
CPC .. *G06F 17/30528* (2013.01); *G06F 17/30023* (2013.01); *G06F 17/30864* (2013.01)

(58) Field of Classification Search
CPC ......... G06F 17/30023; G06F 17/30528; G06F 17/30864
See application file for complete search history.

(56) References Cited

U.S. PATENT DOCUMENTS

| 5,548,758 | A | * | 8/1996 | Pirahesh | ........... | G06F 17/30454 |
| 5,819,286 | A | | 10/1998 | Yang et al. | | |
| 6,006,241 | A | | 12/1999 | Purnaveja et al. | | |
| 6,026,389 | A | | 2/2000 | Nakajima et al. | | |
| 6,081,801 | A | * | 6/2000 | Cochrane | .......... | G06F 17/30433 |
| 6,173,317 | B1 | | 1/2001 | Chaddha et al. | | |
| 6,182,069 | B1 | | 1/2001 | Niblack et al. | | |
| 6,272,495 | B1 | * | 8/2001 | Hetherington | .... | G06F 17/30684 |
| 7,050,110 | B1 | | 5/2006 | Lienhart et al. | | |
| 7,334,186 | B2 | | 2/2008 | Wu | | |
| 7,650,623 | B2 | * | 1/2010 | Hudgeons | .............. | G06Q 30/02 725/105 |
| 7,827,254 | B1 | * | 11/2010 | Nevill-Manning | | G06F 17/30864 709/217 |

(Continued)

OTHER PUBLICATIONS

Porkaew et al., "Query Reformulation for Content Based Multimedia Retrieval on MARS", University of Illinois 1998.*

(Continued)

*Primary Examiner* — Daniel Kuddus
(74) *Attorney, Agent, or Firm* — Middleton Reutlinger

(57) ABSTRACT

Techniques for contextual search on multimedia content are provided. An example method includes extracting entities associated with multimedia content, wherein the entities include values characterizing one or more objects represented in the multimedia content, generating one or more query rewrite candidates based on the extracted entities and one or more terms in a query related to the multimedia content, providing the one or more query rewrite candidates to a search engine, scoring the one or more query rewrite candidates, ranking the scored one or more query rewrite candidates based on their respective scores, rewriting the query related to the multimedia content based on a particular ranked query rewrite candidate and providing for display, responsive to the query related to the multimedia content, a result set from the search engine based on the rewritten query.

20 Claims, 5 Drawing Sheets

(56) References Cited

U.S. PATENT DOCUMENTS

| | | | | |
|---|---|---|---|---|
| 7,840,590 B2* | 11/2010 | Tam | G06F 17/30938 707/696 |
| 7,856,429 B2* | 12/2010 | Herberger | G06Q 10/00 707/705 |
| 8,081,956 B2* | 12/2011 | Aaltonen | G06F 17/30905 455/412.1 |
| 8,122,103 B2* | 2/2012 | Grimault | H04L 12/2805 709/204 |
| 8,433,611 B2* | 4/2013 | Lax | G06Q 30/02 705/14.4 |
| 8,650,210 B1* | 2/2014 | Cheng | G06F 17/30864 707/707 |
| 8,914,394 B1* | 12/2014 | Dubois | G06F 17/30646 707/706 |
| 8,959,071 B2* | 2/2015 | Gunatilake | G06K 9/00744 707/706 |
| 8,972,875 B2* | 3/2015 | Gossweiler, III | G06F 17/30017 715/716 |
| 9,547,690 B2* | 1/2017 | Nowak-Przygodzki | G06F 17/30448 |
| 2002/0131641 A1* | 9/2002 | Luo | G06K 9/52 382/218 |
| 2003/0233375 A1* | 12/2003 | Sagar | G06F 17/30017 |
| 2004/0098376 A1* | 5/2004 | Li | G06F 17/30026 |
| 2009/0144312 A1* | 6/2009 | Patel | G06F 17/30056 |
| 2010/0076840 A1* | 3/2010 | Bem | G06F 17/30967 705/14.48 |
| 2010/0145971 A1* | 6/2010 | Cheng | G06F 17/30023 707/759 |
| 2010/0228776 A1* | 9/2010 | Melkote | G06F 3/0481 707/770 |
| 2012/0084312 A1* | 4/2012 | Jenson | G06F 17/3097 707/767 |
| 2012/0131031 A1* | 5/2012 | Xie | G06F 17/30967 707/765 |
| 2012/0323897 A1* | 12/2012 | Daher | G06F 17/30026 707/723 |
| 2013/0311504 A1* | 11/2013 | Xie | G06F 17/30672 707/765 |
| 2014/0330804 A1* | 11/2014 | Bao | G06F 17/30672 707/706 |
| 2015/0206070 A1* | 7/2015 | Kulkarni | G06N 99/005 706/12 |
| 2015/0227840 A1* | 8/2015 | Codella | G06F 17/30 706/12 |
| 2015/0379079 A1* | 12/2015 | Kota | G06F 17/30448 707/720 |
| 2016/0125028 A1* | 5/2016 | Silvestri | G06F 17/30672 707/718 |

OTHER PUBLICATIONS

Natsev et al., "Semantic Concept-Based Query Expansion and Re-ranking for Multimedia Retrieval", ACM 2007.*

Query reformulation for content based multimedia retrieval in MARS, IEEE 1999.*

International Search Report from PCT/US2015/031362 dated Aug. 6, 2015—4 pages.

Natsev et al., "Semantic Concept-Based Query Expansion and Re-Ranking for Multimedia Retrieval", Proceedings of the 15$^{th}$ International Conference on Multimedia, dated Jan. 1, 2007, New York, New York, p. 991.

Porkaew et al., "Query Reformulation for Content Based Multimedia Retrieval in Mars", IEEE International Conference on Multimedia Computing and Systems, Florence, Italy, dated Jun. 7-11, 1999, pp. 747-751.

Tan, et al., "A Framework for Measuring Video Similarity and Its Application to Video Query by Example," 1999 International Conference on ( vol. 2) Image Processing, 1999, pp. 106-110 vol. 2.

Ahanger, et al., "Video Query Formulation," Multimedia Communications Laboratory Department of Electrical, Computer and Systems Engineering, Boston University, Jan. 9, 1995, pp. 1-21.

Flickner, et al., "Query by Image and Video Content: The QBIC System," IBM Almaden Research Center, San Jose, CA, Sep. 1995, pp. 23-32.

Liu, et al. "A New Approach to Retrieve Video by Example Video Clip," Proceeding of the 7th ACM International Multimedia Conference (Multimedia 99), Orlando, Flordia, 1999, pp. 1-4.

* cited by examiner

CONTEXTUAL SEARCH ON MULTIMEDIA CONTENT

BACKGROUND

The present disclosure relates generally to multimedia content and particularly to contextual search on such content. Users are increasingly consuming multimedia content, such as streaming videos, available on the Web and may have questions related to the multimedia content.

SUMMARY

The disclosed subject matter relates to contextual search on multimedia content.

In some innovative implementations, the disclosed subject matter can be embodied in a method. The method comprises extracting entities associated with multimedia content, where the entities include values characterizing one or more objects represented in the multimedia content, generating one or more query rewrite candidates based on the extracted entities and one or more terms in a query related to the multimedia content, where the generating is performed when the query related to the multimedia content is received from a user, providing the one or more query rewrite candidates to a search engine, scoring the one or more query rewrite candidates based on characteristics of respective result sets resulting from the providing, ranking the scored one or more query rewrite candidates based on their respective scores, rewriting the query related to the multimedia content based on a particular ranked query rewrite candidate and providing for display, responsive to the query related to the multimedia content, a result set from the search engine based on the rewritten query.

In some innovative implementations, the disclosed subject matter can be embodied in a machine readable medium. The machine readable medium includes instructions, which when executed by a processor, cause the processor to perform operations comprising receiving a query related to multimedia content, identifying one or more terms in the query, generating one or more query rewrite candidates based on entities associated with the multimedia content and the one or more terms in the query, where the entities include values characterizing one or more objects represented in the multimedia content, providing the one or more query rewrite candidates to a search engine, scoring the one or more query rewrite candidates based on characteristics of respective result sets resulting from the providing, ranking the scored one or more query rewrite candidates based on their respective scores, rewriting the query related to the multimedia content based on a particular ranked query rewrite candidate, and providing for display, responsive to the query related to the multimedia content, a result set from the search engine based on the rewritten query.

In some innovative implementations, the disclosed subject matter can be embodied in a system. The system comprises a memory comprising instructions and a processor configured to execute the instructions to receive a query related to streaming multimedia content, where the query includes one or more terms, generate one or more query rewrite candidates based on entities associated with the multimedia content and the one or more terms in the query, where the entities include values characterizing one or more objects represented in the multimedia content, provide the one or more query rewrite candidates to a search engine, score the one or more query rewrite candidates based on characteristics of respective result sets resulting from the providing, rank the scored one or more query rewrite candidates based on their respective scores, rewrite the query related to the multimedia content based on a particular ranked query rewrite candidate and provide, without interrupting consumption of the multimedia content, a result set from the search engine based on the rewritten query.

It is understood that other configurations of the subject technology will become readily apparent to those skilled in the art from the following detailed description, where various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The novel features of the subject technology are set forth in the appended claims. However, for purpose of explanation, several configurations of the subject technology are set forth in the accompanying figures summarized below.

DETAILED DESCRIPTION

Figure 1:
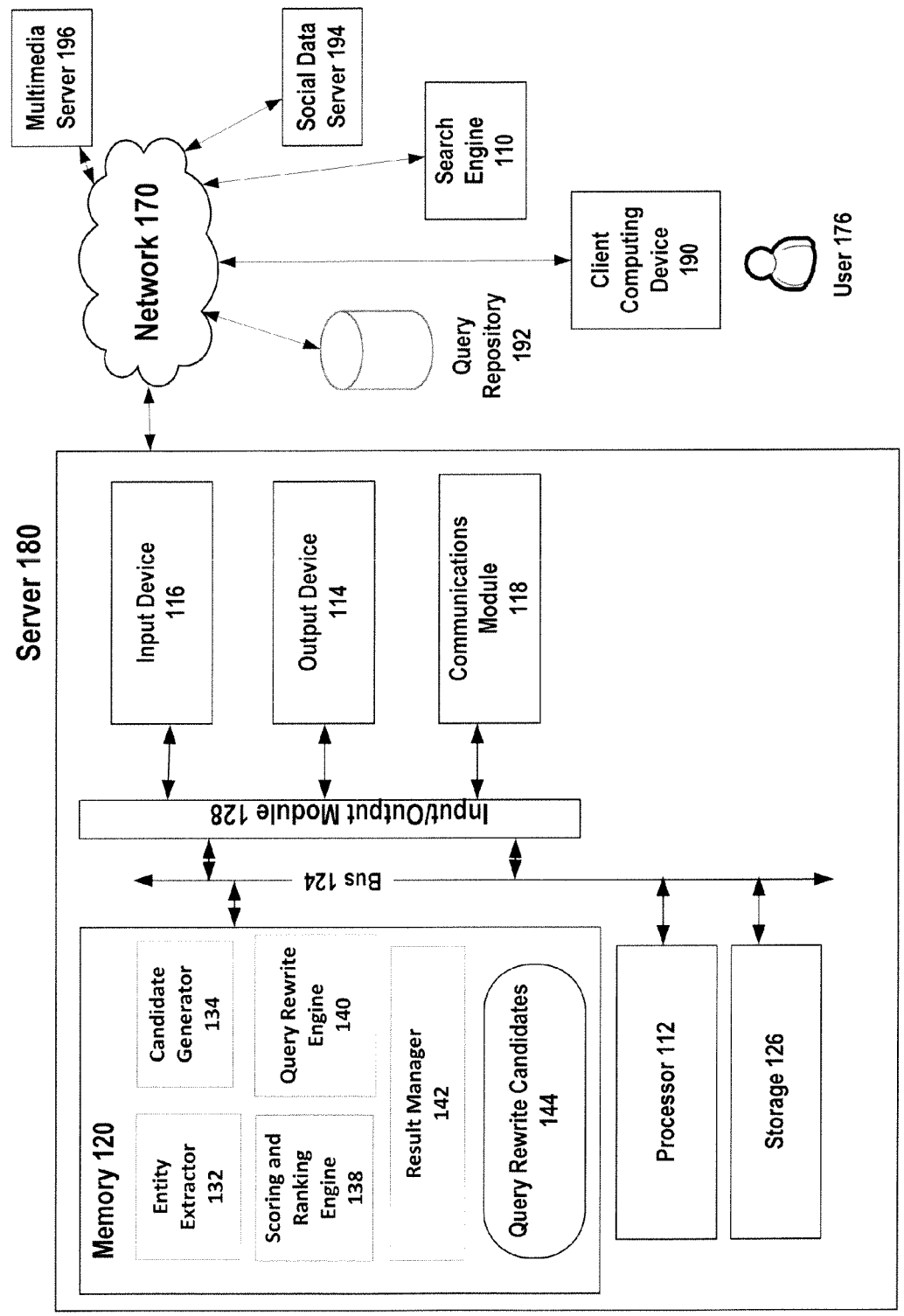
FIG. 1 is a diagram of an example device and network environment suitable for practicing some implementations of the subject technology.

The detailed description set forth below is intended as a description of various configurations of the subject technology and is not intended to represent the only configurations in which the subject technology may be practiced. The appended drawings are incorporated herein and constitute a part of the detailed description. The subject technology is not limited to the specific details set forth herein and may be practiced without these specific details.

When viewing a particular video, users have queries related to objects appearing in the video. For example, when viewing the video a user may want to know a name of a person appearing in the video when the person appears in the video. In another example, the user may want to identify a model of a car appearing in the video. In an attempt to obtain an answer, the user may need type in a title and additional context associated with the video into a web-based search engine interface. The user may then need to search further through results from the search engine to identify a web page including answers to the user's questions regarding the video. This process takes time, diverts attention of the user away from the video and consequently degrades the user's experience. The disclosed implementations modify (e.g., rewrite) a user's query such that the modified (or re-written) query can automatically include context for content to which the query is directed and also provide relevant results to the query while the user is consuming the content. In some implementations, entities associated with multimedia content (e.g., video content) can be extracted. The entities can include values characterizing one or more objects (e.g., persons, articles, etc.) represented in the multimedia content. One or more query rewrite candidates can be generated based on the extracted entities and one or more terms in a query related to the multimedia content. The generating can be performed when the query related to the multimedia content is received from a user. For example, the user may provide the query via a search box when viewing streaming video content. The user may also provide the query via voice. The query may relate to a person or article appearing in the video content. By way of non-limiting example, the user may provide a query that asks "Who is this person?" while viewing video content without providing any additional context in the query. Additional examples of user queries are discussed below.

The query rewrite candidates can be provided to a search engine. The query rewrite candidates may be scored based on one or more of characteristics of respective result sets resulting from the providing the query rewrite candidates to the search engine, previous search queries associated with the search engine or a time associated with the query. The scored query rewrite candidates may be ranked based on their respective scores. A particular ranked (e.g., highest ranked) query rewrite candidate may be used to rewrite the query. For example, the query may be replaced by the particular ranked query rewrite candidate. Responsive to the query related to the multimedia content, a result set that is based on the rewritten query is provided (e.g., displayed) to the user.

The result set may be provided to the user in real-time as the user is consuming the multimedia content. The result set may be provided without interrupting the provision of the multimedia content to the user. Thus, the user need not perform a search on a separate search engine and then further search through results from the search engine to identify a web page including answers to the user's query regarding the multimedia content. In this way, the user's attention need not be diverted from the multimedia content. This improves the user's experience.

Some aspects of the subject technology include storing information regarding queries provided to a search engine. A user has the option of preventing storage of such information. The user may also be provided with an opportunity to control whether programs or features collect or share user information (e.g., information about a user's search queries, a user's preferences, etc.). Thus, the user may have control over how information is collected about the user and used by a server.

FIG. 1 is a diagram illustrating example architecture for contextual search on multimedia content according to some implementations of the subject technology. Server 180 includes processor 112, memory 120, storage 126, bus 124, input/output module 128, input device 116, output device 114 and communications module 118. Memory 120 includes entity extractor 132, candidate generator 134, scoring and ranking engine 138, query rewrite engine 140, result manager 142 and query rewrite candidates 144. Server 180 may additionally include an output device (e.g., touch screen display, non-touch screen display), input device (e.g., a keyboard, touchscreen, or mouse) to receive user input. In some implementations, server 180 includes one or more modules for facilitating user interaction with via a browser or a special purpose application executing on client computing device 190 or for processing data stored in social data repository 110. Server 180 may be implemented as a single machine with a single processor, a multi-processor machine, or a server farm including multiple machines with multiple processors. Communication module 118 can enable server 180 to send and receive data over network 150 to search engine 110, query repository 192, social data server 194, multimedia server 196 and client computing devices 190.

In some implementations server 180 can be associated with search engine 110 and may send and receive data over network 150 to search engine 110. Search engine 110 can be a web search engine. A web search engine is a software system that is designed to search for information on the World Wide Web. The search results may be presented in lines of results often referred to as search engine results pages (SERPs). The information may include web pages, images, information and other types of files. Search engine 110 can maintain real-time information by using a web crawler. As an example operation, not intended to limit the embodiments, search engine 110 can store information about many web pages, which search engine 110 may retrieve from the markup language defining the web pages. These pages are retrieved by the web crawler (sometimes also known as a "spider").

Search engine 110 may then analyze contents of each page to determine how a web page should be indexed (for example, words can be extracted from titles, page content, headings, or special fields called meta tags). Data regarding web pages and other web content can be stored in an index database for use in later queries. A query may be received from server 180. The index helps search engine 110 find information relating to the query. When a query is received by the search engine 110 (typically by using keywords), the search engine 110 can examine the index and provides a listing of best-matching web pages and web content, usually with a short summary containing the content title and sometimes parts of text of the content. In some implementations, the query repository 192 may store one or more queries received by the search engine 110 over time. The queries may be received from users or other web services accessing the search engine 110.

In some implementations, multimedia server 196 can include data including but not limited to video, audio, text, images or any combination thereof. The data stored at the multimedia server 196 may be provided for display in web pages or any other web content areas. For example, a video stored at the multimedia server 196 may be streamed to a web page for display to user 176 via client computing device 190. In another example, audio stored at multimedia server 196 may be streamed to a web page for playback to user 176 via client computing device 190.

In some implementations server 180 can be associated with a social data server 194 that includes social data and may send and receive data over network 150 to the social data server 194. In some implementations, social data server 194 may store social content item(s) (e.g., posted content item(s)) associated with a social networking service. Social data server 194 may also store data related to user accounts and content items that are associated with the user accounts. For example, social data server 194 can include data indicating content items that have been viewed, shared, commented on, favored or disfavored by a user account associated with a user. Social data server 194 may store a social connection data structure that is indicative of social connections between user accounts associated with the social networking service. Social data server 194 may also store user comments made (or annotations) towards multimedia content consumed by the user and stored at multimedia server 196.

In some implementations, search engine 110, multimedia server 196, social data server 194 and server 180 can communicate with one another and with client computing device 190 via a network 150. Network 150 may include the Internet, an intranet, a local area network, a wide area network, a wired network, a wireless network, or a virtual private network (VPN). While only one search engine 110, multimedia server 196, social data server 194, server 180, and client computing device 190 are illustrated, the subject technology may be implemented in conjunction with any number of search engines 110, multimedia servers 196, social data servers 194, servers 180, and client computing devices 190. In some non-limiting implementations, a single computing device may implement the functions of search engine 110, multimedia server 196, social data server 194, server 180 and other components illustrated in FIG. 1.

Client computing device 190 can be a laptop computer, a desktop computer, a mobile phone, a personal digital assistant (PDA), a tablet computer, a netbook, a television with one or more processors embedded therein or coupled thereto, a physical machine, or a virtual machine. Client computing device 190 may each include one or more of a keyboard, a mouse, a display, or a touch screen. Client computing device 190 can each include a browser configured to display webpages. For example, the browser can display a webpage including multimedia content from the multimedia server 196. Alternatively, client computing device 190 may include special-purpose applications (e.g., mobile phone or tablet computer applications) for accessing multimedia content.

As discussed above, memory 120 of server 180 can include entity extractor 132, candidate generator 134, scoring and ranking engine 138, query rewrite engine 140, result manager 142 and query rewrite candidates 144. In some implementations, entity extractor 132 extracts entities associated with multimedia content. The entities may include values characterizing one or more objects represented in the multimedia content. For example, the entities may include names of persons, locations, objects, appearing in a video, etc. The entities may be extracted from metadata associated with the multimedia content (e.g., file name, media properties, etc.). The entities may also be extracted from other data associated with the multimedia content. The other data may include, for example, user comments and annotations related to the multimedia content. The multimedia content may include a streaming video that is being viewed by user 176. The multimedia content may also include content that is stored at the multimedia server 196. The multimedia content may be content that is presently displayed at the computing device 190.

In some implementations, entity extractor 132 extracts entities that appear in the multimedia content at a particular time (or time range) in the multimedia content. For example, if the multimedia content is a video that is being viewed by user 176 and the user is ten minutes into the video (or ten minute mark), the entity extractor 132 may extract entities that appear in the video at the ten minute mark or in a range of time that includes the ten minute mark. In some implementations, entity extractor 132 extracts entities that appear in the content at a time at which user 176 provides a query via an interface at the client computing device 190. For example, if user 176 provides a query at fifteen minutes into the video, entity extractor 132 may extract entities that appear in the video at the fifteen minute mark or in a range of time that includes the fifteen minute mark. The range of time may be a predetermined (or preset) range of time (e.g., two minute range, twenty second range, etc.). In some implementations, entity extractor 132 extracts timestamps associated with the entities that may indicate when the entities appear in the multimedia content.

In some implementations, entity extractor 132 may transform all (or a subset) of metadata of the multimedia content. Entity extractor 132 may read user comments (e.g. text of comments) and annotations associated with the multimedia content and extract entities associated with such user generated data. For example, entity extractor 132 may read comments and annotations associated with the multimedia content and stored at the social data server 194. In some implementations, entity extractor 132 labels sequences of words in text (e.g., text or metadata or comments) which are the names of things, such as person, company names, objects and any other human and non-human representations that appear in multimedia content.

In some implementations, entity extractor 132 may locate and classify text into pre-defined categories such as the names of persons, organizations, objects, locations, expressions of times, quantities, monetary values, percentages, etc. For example, when entity extractor 132 parses a block of text, such as, "Jim bought a red SUV in 2007" entity extractor 132 can generate an annotated block of text that highlights the names of entities $[Jim]_{Person}$ bought a $[red]_{color}$ $[SUV]_{Vehicle}$ in $[2007]_{Time}$. As an example, an output of this entity extractor 132 may be represented as P={p_1, p_2, . . . }, where p_1, p_2, etc. represent extracted entities. With reference to the above example, [Jim] person may be entity p_1, $[red]_{color}$ may be another entity p_2, etc. The entities extracted by entity extractor 132 can be used by the candidate generator to generate query rewrite candidates 144.

In some implementations, candidate generator 134 generates one or more query rewrite candidates 144 based on the extracted entities and one or more terms in a query provided by user 176. The query provided by user 176 may be related to multimedia content that the user may be consuming via the client computing device 190. In some implementations, the generation of query rewrite candidates 144 by candidate generator 134 can be performed when the query related to the multimedia content is received from user 176. In some scenarios, the query may not include any context. For example, when viewing the video a user may want to know a name of a person appearing in the video when the person appears in the video. In this example, user 176 may provide the query "Who is this person?" The query may be provided by user 176 when the person appears in the video. In another example, the user may want to identify a model of a car appearing in the video. In this example, user 176 may provide the query "Which car is this?" or "Which car?" The queries may also include queries such as "What is the price of this car?" "Where is this car made?" "Who is the person driving this car?" "Show me other videos that have this car" etc. In these queries, the user has not provided context, such as, the name of the video, characteristics of the car or person or any other context.

The query provided by user 176 may include one or more query terms (e.g., which, car, made, color, etc.). In some implementations, candidate generator 134 may, for each element in an extracted entity set P={p_1, p_2, . . . }, and user query q, define a function C (p, q)→{(p,q,r_1), . . . , (p,q,r_{N_p})} that takes the input pair (p, q) and generates N_p rewrite candidates. A non-limiting example of such generation is a concatenation of p and q which can generate N_p rewrite(s). Using alternative information, or natural language grammars, candidate generator 134 can generate additional query rewrite candidates 144. The alternative information may include queries stored at query repository 192. For example, candidate generator 134 may consider queries that include terms similar to p (e.g., p_1) and q that are provided previously to search engine 110 and stored at query repository 192. In some implementations, candidate generator 134 may concatenate different input pairs p and q to generate an output set Q={C(p_1, q)+C(p_2,q) . . . }, where Q represents a set of query rewrite candidates 144.

In some implementations, query rewrite candidates 144 may be based on different combinations of the query terms and entities extracted by entity extractor 132. For example, when viewing the video a user may want to know a name of a car appearing in the video when the person appears in the video. In this example, user 176 may provide the query "Who is the manufacturer of this car?" The query terms in this query are "Who, is, the, manufacturer, of, this, car." The entity extractor 132 may have extracted the entities appearing in the video at the time of the query as "CarC, Red, Italy" where CarC is a name associated with the car, Red is a color of the car and Italy is a country of origin. The candidate generator 134 can generate one or more query rewrite candidates 144 that include "Who is the manufacturer of CarC," "Who is CarC manufacturer," "CarC manufacturer who is." In this way, the query rewrite candidates 144 are generated by candidate generator 134 to automatically include context in the query provided by user 176, where the context is provided by the entities extracted by entity extractor 132.

In another example, when viewing the video a user may want to know names of films in which a person has acted. In this example, user 176 may provide the query "Which films has he acted in?" when the person appears in the video. The query terms in this query are "Which, films, has, he, acted, in" Entity extractor 132 may have extracted the entities appearing in the video at the time of the query as "John Doe, Deep Space" where "John Doe" is the name associated with the person and Deep Space is the name of a film. The candidate generator 134 generates one or more query rewrite candidates 144 that include "Films acted John Doe Deep Space," "Acted John Doe Deep Space," "Films John Doe," "Which films has John Doe acted in," etc. In this way, query rewrite candidates 144 may be based on different combinations of the query terms and entities extracted by entity extractor 132.

It is to be appreciated that the disclosed embodiments are not limited to combinations (or concatenations) of query terms and extracted entities. In some implementations, query re-write candidates may be generated by candidate generator 134 based on other heuristics. The other heuristics can include queries that are similar (or including similar terms) to one or more of the generated query candidates. Queries similar to one or more of the generated query candidates may be determined from query repository 192. For example, if "Films acted John Doe Deep Space" is a candidate query, candidate generator 134 may read query repository 192 and identify another query, e.g., "Which films has John Doe acted in" that is similar (e.g., includes one or more similar terms) to the candidate query. Thus for example, "Which films has John Doe acted in" may be determined to be another candidate query based on the initial candidate query "Films acted John Doe Deep Space." Thus, for the query "Which films has he acted in?" that has been provided by user 176, query rewrite candidates 144 may be "Films acted John Doe Deep Space" and "Which films has John Doe acted in."

In some implementations, scoring and ranking engine 138 may score one or more extracted entities based on or a time associated with a query initially provided by user 176 and timestamps and properties of extracted entities. For example, scoring and ranking engine 138 may review timestamp information that may be associated with one or more extracted entities. If an entity p_i is annotated at a time T at which a query is provided by user 176 in the video, the entity p_i may receive a positive score from the scoring and ranking engine 138 and a penalty if p_i is not mentioned at or near that time T. For example, consider that a user provides a query "When is the next game?" at ten minutes into a streaming video. If, for example, the entities "athlete" or "sports teams" are annotated at or substantially at 10 minutes (or 9-12 minutes), then scoring and ranking engine 138 may assign a higher score to the entities "athlete" or "sports teams" relative to other entities. Extracted entities associated with higher scores relative to other extracted entities may then be used by candidate generator 134 to generate query rewrite candidates 144.

In some implementations, scoring and ranking engine 138 may score one or more extracted entities based co-occurrences of n-grams that may be stored in query repository 192. An n-gram can be a contiguous sequence of n items from a given sequence of text or speech. In other words, for example, an n-gram can be considered to be a combination of items. The items can be, for example, phonemes, syllables, letters, words or base pairs. The n-grams typically are collected from a text or speech corpus (e.g., query repository 192). An n-gram of size one is referred to as a "unigram"; size two is a "bigram" (or, less commonly, a "diagram"); size three is a "trigram". Larger sizes are sometimes referred to by the value of n, e.g., "four-gram", "five-gram", and so on.

In some implementations, scoring and ranking engine 138 can read query repository 192, to identify what are likely entity types for given n-grams of a query q. For each entity p_i extracted by entity extractor 132, if the extracted entity is one of most likely entities based on a review of n-grams in query repository 192, scoring and ranking engine 138 may assign a positive score to the extracted entity and a penalty otherwise. For example for a query, "When is the next game" scoring and ranking engine 138 would increase the score of an entity p_i which is of type "sport teams" and "athlete." Extracted entities associated with higher scores relative to other extracted entities may then be used by candidate generator 134 to generate query rewrite candidates 144.

In this way, based on heuristics such as previous queries or query logs, times when a query is provided and entities are annotated, and co-occurrences of n-grams, candidate generator 134 may generate one or more query rewrite candidates 144. Query rewrite candidates 144 determined by candidate generator 134 can be scored and ranked by scoring and ranking engine 138.

In some implementations, scoring and ranking engine 138 may provide one or more query rewrite candidates 144 to search engine 110. The scoring and ranking engine 138 may then score one or more query rewrite candidates 144 based on characteristics of respective result sets resulting from the providing query rewrite candidates 144 to the search engine 110. In some non-limiting implementations, scoring and ranking engine 138 may also score query rewrite candidates 144 based on previous search queries associated with the search engine 110 (e.g., queries stored at query repository 192) or a time associated with a query initially provided by user 176.

In some implementations, result quality may be a characteristic of a result set resulting from the providing query rewrite candidates 144 to the search engine 110. The result quality of result set may be based on a number or search results retrieved from a search engine based on a query rewrite candidate. For example, the quality of the result set may be determined to be higher relative to another result set if the result set has more results than the other result set. The quality may also be based on the diversity of search results. For example, the quality of the result set may be determined to be higher relative to another result set if the result set has results related to audio, video, text while the other result set may have results related to just text. The quality may also be based on the relevance of search results based on the query rewrite candidate. For example, the quality of the result set may be determined to be higher relative to another result set if the result set has results including terms similar or identical to the query terms.

The quality of the result set may be determined based on any other property or characteristic of the result set. In some implementations, given the query rewrite candidate set "Q", the scoring and ranking engine 138 defines a function S (p,q,r)→R_+ that assigns a score of the rewrite given the inputs p and q. For example a number of high quality search results resulting from providing a query rewrite candidate 'r' to search engine 110 could be a quality score. These examples are purely illustrative and are not intended to limit the disclosed implementations.

In some implementations, scoring and ranking engine 138 ranks the scored one or more query rewrite candidates 144 based on their respective scores. For example, a query rewrite candidate associated with a higher number of results may have a higher rank in comparison to another query rewrite candidate have a lower number of results. With reference to an example noted above, the query rewrite candidate "Which is CarC manufacturer" may result in 100 results from search engine 110. However, the query rewrite candidate "CarC manufacturer which is" may generate 80 results. In this example, scoring and ranking engine 138 may rank the query rewrite candidate "Which is CarC manufacturer" higher relative to the query rewrite candidate "CarC manufacturer which is."

Referring to another example noted above, the query candidate "Which films has John Doe acted in" may result in audio, video and text results from search engine 110. However, the query candidate "Films acted John Doe Deep Space" may result in only text results. In this example, scoring and ranking engine 138 may rank the query rewrite candidate "Which films has John Doe acted in" higher relative to the query rewrite candidate "Films acted John Doe Deep Space" because the "Which films has John Doe acted in" has produced a more diverse result set relative to the query rewrite candidate "Films acted John Doe Deep Space." In some implementations, a highest ranked candidate of query rewrite candidates 144 may be determined as:=argmax_{x elt of Q} S(x). Arg max represents an argument of the maximum, that is to say, the set of points of the given argument for which the given function attains its maximum value. In other words, arg max of f(x) can be a set of values of x for which f(x) attains its largest value M.

As noted above, scoring and ranking engine 138 can rank the scored one or more query rewrite candidates 144 based on their respective scores. Query rewrite engine 140 may then rewrite the query related to the multimedia content based on a particular ranked query rewrite candidate. In some implementations, the particular ranked query rewrite candidate may be a highest ranked query rewrite candidate.

For example, if a query provided by user 176 is "Which films has he acted in?," query rewrite engine 140 may automatically rewrite the query as "Which films has John Doe acted in." The rewritten query may then be provided by the query rewrite engine to search engine 110. Result manager 142 may then provide for display, responsive to the query related to the multimedia content, a result set from search engine 110 based on the rewritten query. As an example, the result set may include names of films (e.g., "Deep Space, Galaxy Travel, Mysteries of Jupiter.") The result set may be provided by result manager 142 to user 176 in real-time as user 176 is consuming the multimedia content. The result set may be provided without interrupting the provision of the multimedia content to user 176. Thus, user 176 need not perform a search on a separate search engine and then further search through results from the search engine to identify a web page including answers to user 176's query regarding the multimedia content. In this way, user 176's attention need not be diverted from the multimedia content. This improves user experience.

The result set may be displayed at a user interface of the client computing device 192. In some implementations, the result set may be displayed as a pop-up near the multimedia content. For example, the user may provide a query related to video content through voice input and may view the results of the query in a pop-up interface displayed near the video content. The results may be displayed without interrupting the video or suspending playback of the video. The results included in the result set can include relevant responses to the users query. For example, if user 176 provides a query "Which films has John Doe acted in?" the result set may be displayed as a pop-up that includes "Deep Space, Galaxy Travel, Mysteries of Jupiter." The result set may also include audio, video and any other multimedia content. In some implementations, the result set may be vocalized via a speaker associated with computing device 190 so that the user may listen to the results.

Figure 2A:
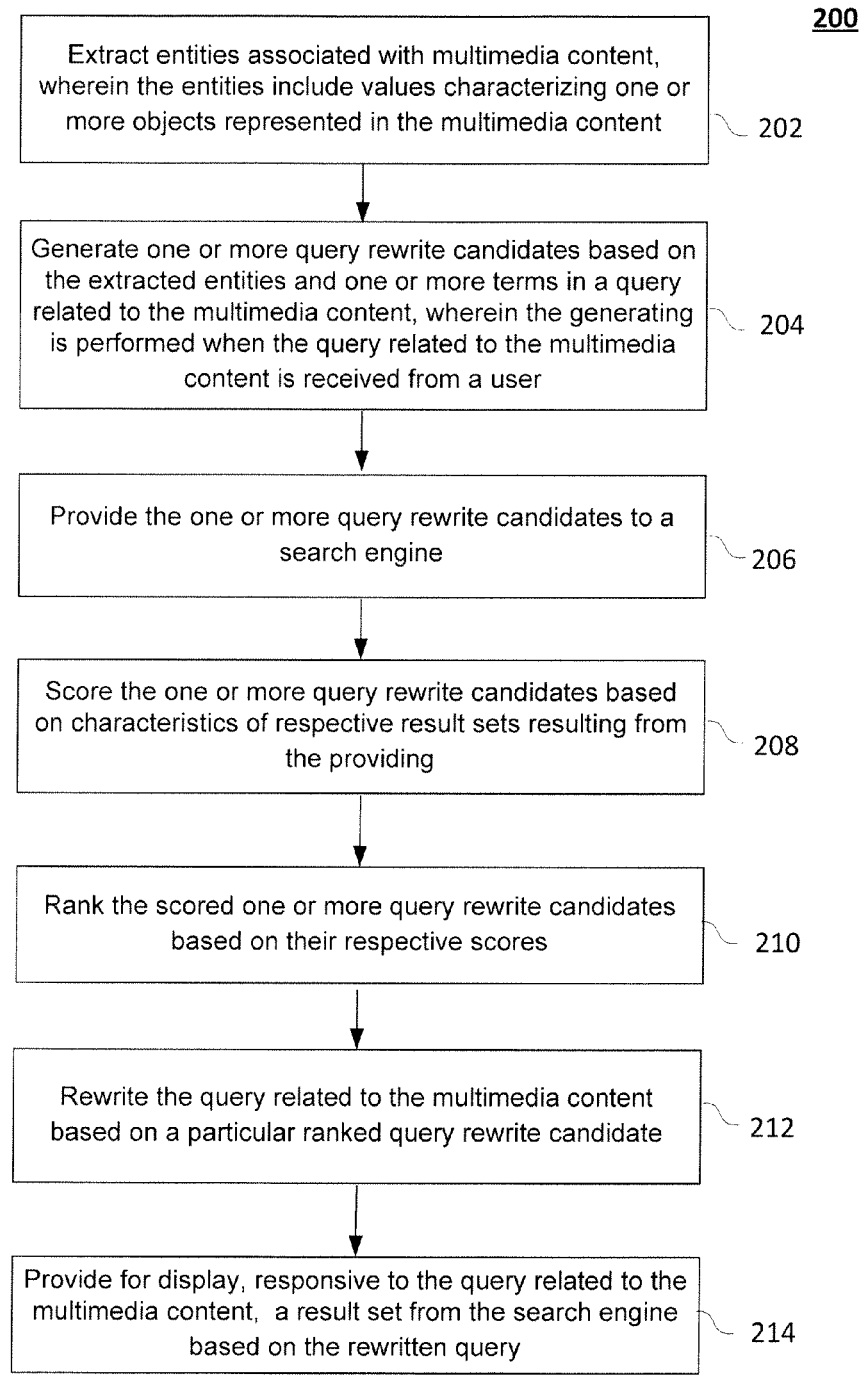
FIG. 2A is an example process for practicing implementations of the subject technology using the example device of FIG. 1.

FIG. 2A is an example process 200 for practicing implementations of the subject technology using the example architecture of FIG. 1. Although FIG. 2A is described with reference to the elements of FIG. 1, the process of FIG. 2A is not limited to such and can be applied within other systems.

Process 200 begins with extracting entities associated with multimedia content (block 202). The entities include values characterizing one or more objects represented in the multimedia content. As noted above, in some implementations, entity extractor 132 extracts entities associated with multimedia content. The entities may include values characterizing one or more objects represented in the multimedia content. For example, the entities may include names of persons, locations, objects, appearing in a video, etc. The entities may be extracted from metadata associated with the multimedia content (e.g., file name, media properties, etc.). The entities may also be extracted from other data associated with the multimedia content.

One or more query rewrite candidates are generated based on the extracted entities and one or more terms in a query related to the multimedia content (block 204). The generation can be performed when the query related to the multimedia content is received from a user. As an example, candidate generator 134 generates one or more query rewrite candidates 144 based on the extracted entities and one or more terms in a query provided by user 176. The query provided by user 176 may be related to multimedia content that the user may be consuming via the client computing device 190. In some implementations, the generation of query rewrite candidates 144 by candidate generator 134 can be performed when the query related to the multimedia content is received from user 176.

The one or more query rewrite candidates are provided to a search engine (block 206) and can be scored based on characteristics of respective result sets resulting from the providing (block 208). As an example, scoring and ranking engine 138 may provide one or more query rewrite candidates 144 to search engine 110. The scoring and ranking engine 138 may then score one or more query rewrite candidates 144 based on characteristics of respective result sets resulting from the providing query rewrite candidates 144 to the search engine 110.

The scored one or more query rewrite candidates can be ranked based on their respective scores (block 210). For example, a query rewrite candidate associated with a higher number of results may have a higher rank in comparison to another query rewrite candidate have a lower number of results. In another example, a query rewrite candidate associated with more diverse result (e.g., audio, video and text) set relative to the query rewrite candidate may have a higher rank in comparison to another query rewrite candidate having less diverse results (e.g., only text).

The query related to the multimedia content can be rewritten based on a particular ranked query rewrite candidate (block 212). As an example, query rewrite engine 140 may then rewrite the query related to the multimedia content based on a particular ranked query rewrite candidate. In some implementations, the particular ranked query rewrite candidate may be a highest ranked query rewrite candidate. For example, if a query provided by user 176 is "Which films has he acted in?," query rewrite engine 140 may automatically rewrite the query as "Which films has John Doe acted in." The rewritten query may then be provided by the query rewrite engine to search engine 110.

A result set from the search engine based on the rewritten query can be provided for display responsive to the query related to the multimedia content (block 214). As an example, result manager 142 may provide for display, responsive to the query related to the multimedia content, a result set from search engine 110 based on the rewritten query. As an example, the result set may include names of films (e.g., "Deep Space, Galaxy Travel, Mysteries of Jupiter.") The result set may be provided by result manager 142 to user 176 in real-time as user 176 is consuming the multimedia content. The result set may be provided without interrupting the provision of the multimedia content to user 176. Thus, user 176 need not perform a search on a separate search engine and then further search through results from the search engine to identify a web page including answers to user 176's query regarding the multimedia content. In this way, user 176's attention need not be diverted from the multimedia content. This improves user experience.

Figure 2B:
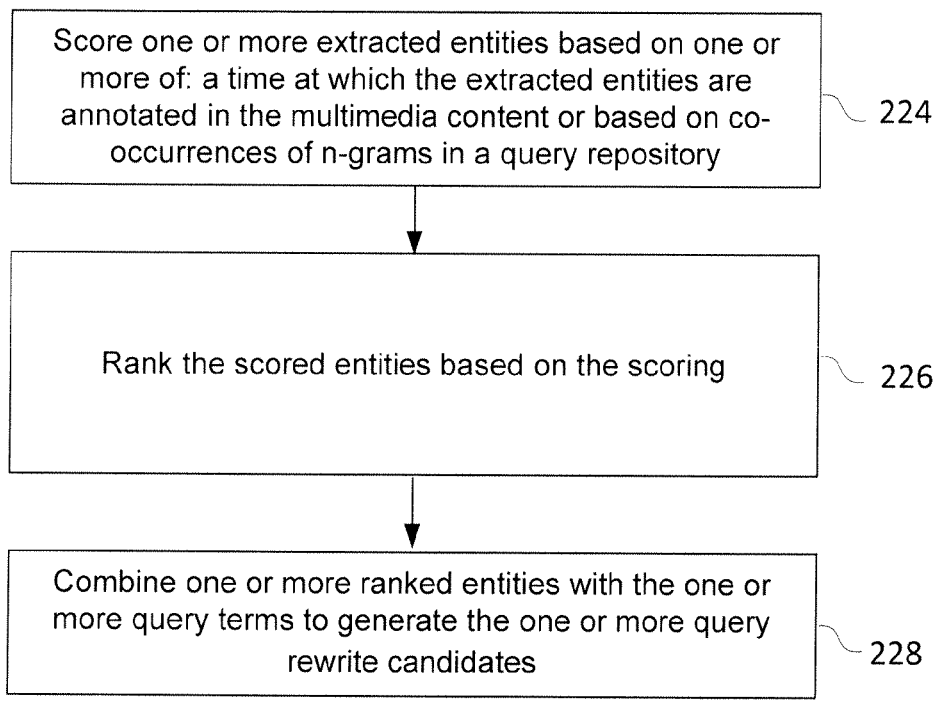
FIG. 2B is an example process illustrating a block of FIG. 2A in greater detail for practicing implementations of the subject technology using the example device of FIG. 1

FIG. 2B is an example process illustrating block 204 of FIG. 2A in greater detail for practicing implementations of the subject technology using the example device of FIG. 1. Although FIG. 2B is described with reference to the elements of FIG. 1, the process of FIG. 2B is not limited to such and can be applied within other systems.

One or more extracted entities are scored based on one or more of: a time at which the extracted entities are annotated in the multimedia content or based on co-occurrences of n-grams in a query repository (block 224). As an example, scoring and ranking engine 138 can score the extracted entities based on one or more of: a time at which the extracted entities are annotated in the multimedia content or based on co-occurrences of n-grams in query repository 192 or any other characteristics of queries stored in the query repository 192. The scored entities can then be ranked based on the scoring (block 226). The scored extracted entities can be combined with the one or more query terms to generate the one or more query rewrite candidates (block 228).

Figure 3:
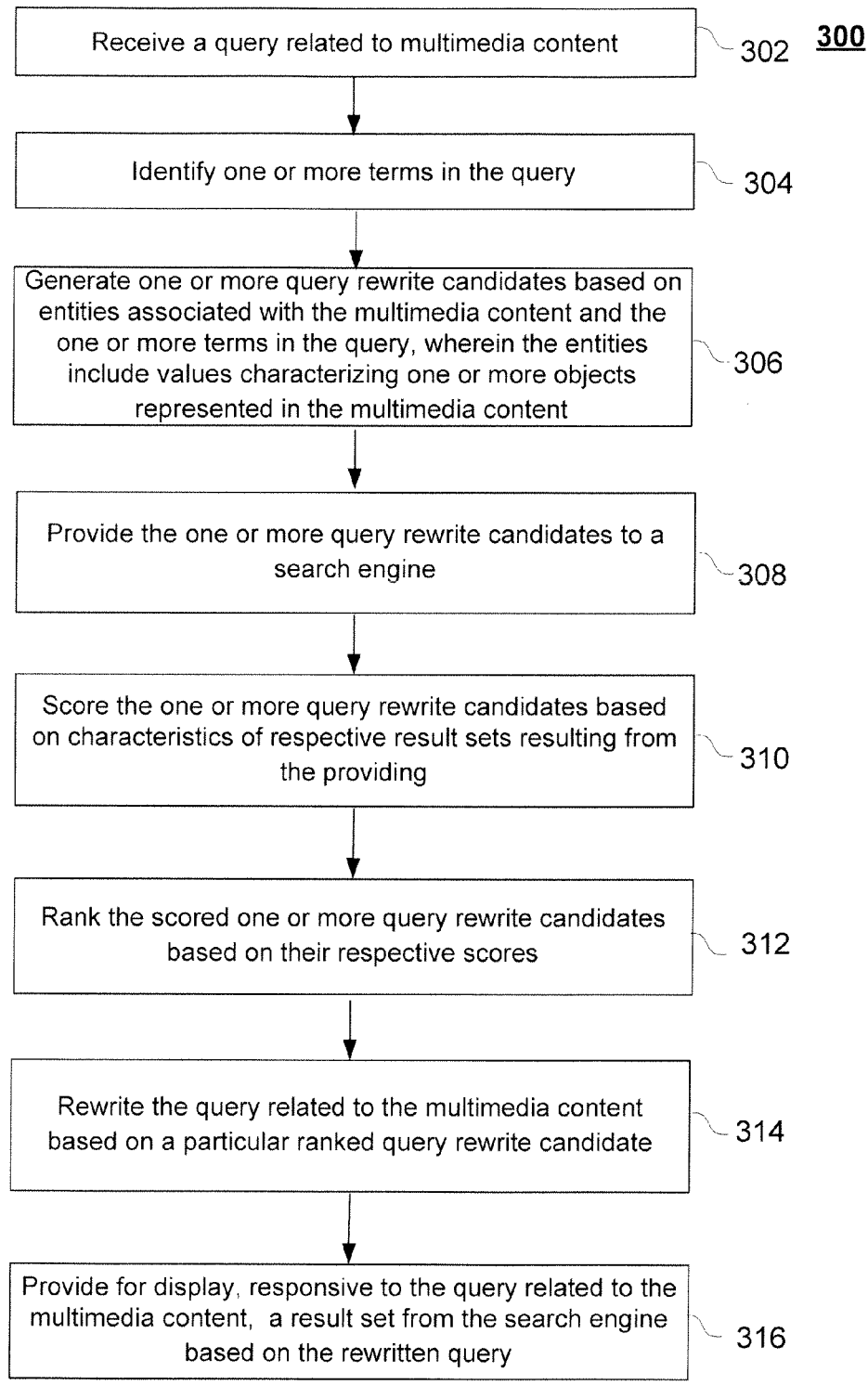
FIG. 3 illustrates another example process for practicing implementations of the subject technology using the example device of FIG. 1.

FIG. 3 is an example process 300 for practicing implementations of the subject technology using the example device of FIG. 1. Although FIG. 3 is described with reference to the elements of FIG. 1, the process of FIG. 3 is not limited to such and can be applied within other systems.

Process 300 begins with receiving a query related to multimedia content (block 302). As an example, the query may be received at server 180 from client computing device 190. User 176 may provide the query to the client computing device 190 via a user interface (e.g., web browser interface) displayed at the client computing device 190. The query may be provided by the user 176 while the user is consuming (e.g., viewing) the multimedia content without interrupting playback or streaming of the multimedia content. In other words, the user need not pause or stop the multimedia content or navigate away from a content area displaying the multimedia content.

One or more terms may be identified from the query (block 304). As an example, entity extractor 132 may identify one or more terms in a query received from client computing device 190.

One or more query rewrite candidates can be generated based on entities associated with the multimedia content and the one or more terms in the query (block 306). The entities can include values characterizing one or more objects represented in the multimedia content. As noted above, in some implementations, entity extractor 132 extracts entities associated with multimedia content. The entities may include values characterizing one or more objects represented in the multimedia content. For example, the entities may include names of persons, locations, objects, appearing in a video, etc. The entities may be extracted from metadata associated with the multimedia content (e.g., file name, timestamp(s), media properties, etc.). The entities may also be extracted from other data associated with the multimedia content. The generation can be performed when the query related to the multimedia content is received from a user. As an example, candidate generator 134 generates one or more query rewrite candidates 144 based on the extracted entities and one or more terms in a query provided by user 176. The query provided by user 176 may be related to multimedia content that the user may be consuming via the client computing device 190. In some implementations, the generation of query rewrite candidates 144 by candidate generator 134 can be performed when the query related to the multimedia content is received from user 176.

The one or more query rewrite candidates are provided to a search engine (block 308) and can be scored based on characteristics of respective result sets resulting from the providing (block 310). As an example, scoring and ranking engine 138 may provide one or more query rewrite candidates 144 to search engine 110. The scoring and ranking engine 138 may then score one or more query rewrite candidates 144 based on characteristics of respective result sets resulting from the providing query rewrite candidates 144 to the search engine 110.

The scored one or more query rewrite candidates can be ranked based on their respective scores (block 312). For example, a query rewrite candidate associated with a higher number of results may have a higher rank in comparison to another query rewrite candidate have a lower number of results. In another example, a query rewrite candidate associated with more diverse result (e.g., audio, video and text) set relative to the query rewrite candidate may have a higher rank in comparison to another query rewrite candidate having less diverse results (e.g., only text).

The query related to the multimedia content can be rewritten based on a particular ranked query rewrite candidate (block 314). As an example, query rewrite engine 140 may then rewrite the query related to the multimedia content based on a particular ranked query rewrite candidate. In some implementations, the particular ranked query rewrite candidate may be a highest ranked query rewrite candidate. For example, if a query provided by user 176 is "Which films has he acted in?," query rewrite engine 140 may automatically rewrite the query as "Which films has John Doe acted in." The rewritten query may then be provided by the query rewrite engine to search engine 110.

A result set from the search engine based on the rewritten query can be provided for display responsive to the query related to the multimedia content (block 316). As an example, result manager 142 may provide for display, responsive to the query related to the multimedia content, a result set from search engine 110 based on the rewritten query. As an example, the result set may include names of films (e.g., "Deep Space, Galaxy Travel, Mysteries of Jupiter.") The result set may be provided by result manager 142 to user 176 in real-time as user 176 is consuming the multimedia content. The result set may be provided without interrupting the provision of the multimedia content to user 176. Thus, user 176 need not perform a search on a separate search engine and then further search through results from the search engine to identify a web page including answers to user 176's query regarding the multimedia content. In this way, user 176's attention need not be diverted from the multimedia content. This improves user experience.

Figure 4:
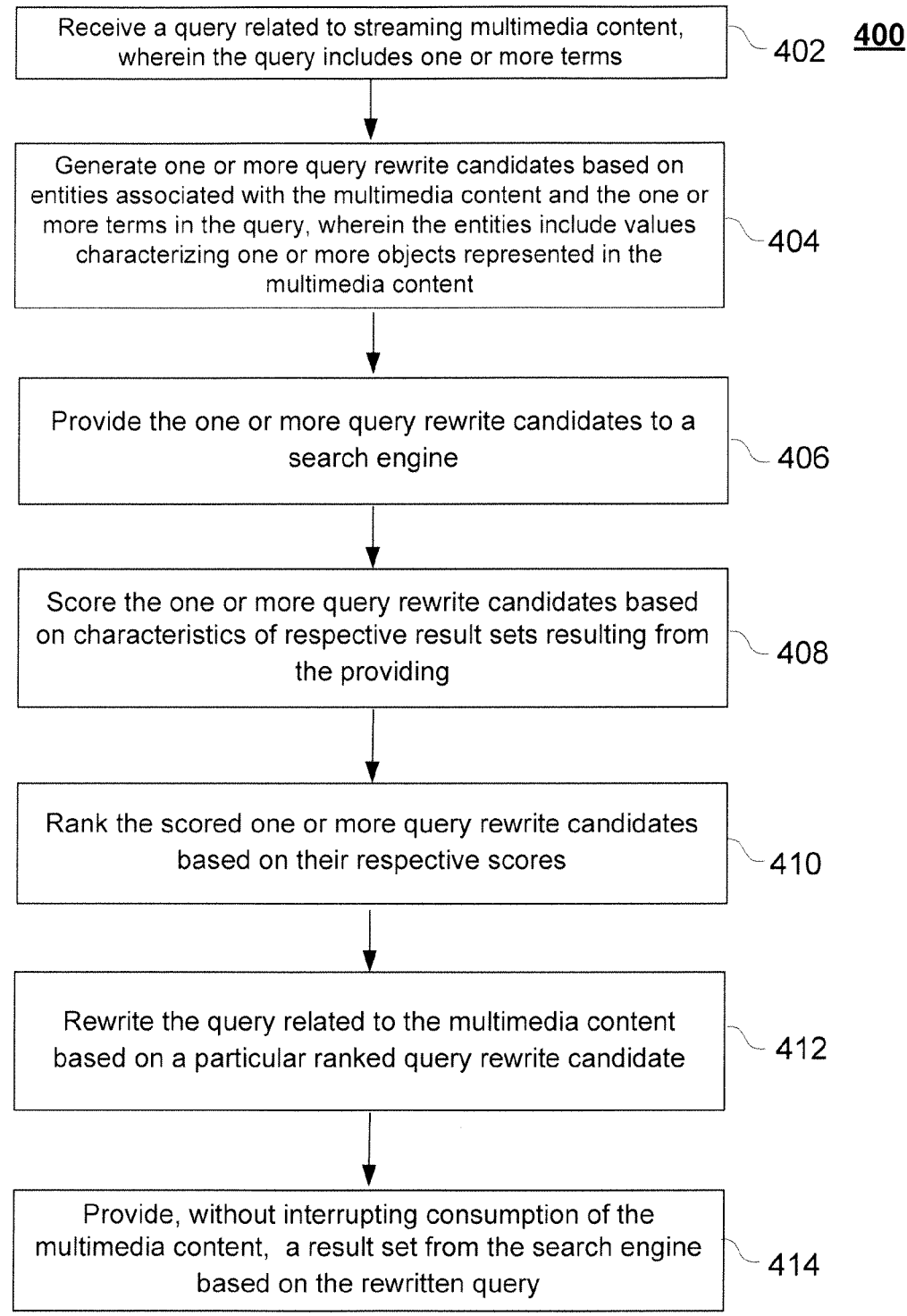
FIG. 4 illustrates yet another example process for practicing implementations of the subject technology using the example device of FIG. 1.

FIG. 4 is an example process 400 for practicing implementations of the subject technology using the example device of FIG. 1. Although FIG. 4 is described with reference to the elements of FIG. 1, the process of FIG. 4 is not limited to such and can be applied within other systems.

Process 400 begins with receiving a query related to multimedia content (block 402). As an example, the query may be received at server 180 from client computing device 190. User 176 may provide the query to the client computing device 190 via a user interface (e.g., web browser interface) displayed at the client computing device 190. The query may include one or more query terms. The query may be provided by the user 176 while the user is consuming (e.g., viewing, listening, interacting, etc.) the multimedia content without interrupting playback or streaming of the multimedia content. In other words, the user need not pause or stop the multimedia content or navigate away from a content area displaying the multimedia content.

One or more query rewrite candidates can be generated based on entities associated with the multimedia content and the one or more terms in the query (block 404). The entities can include values characterizing one or more objects represented in the multimedia content. As noted above, in some implementations, entity extractor 132 extracts entities associated with multimedia content. The entities may include values characterizing one or more objects represented in the multimedia content. For example, the entities may include names of persons, locations, objects, appearing in a video, etc. The entities may be extracted from metadata associated with the multimedia content (e.g., file name, timestamp(s), media properties, etc.). The entities may also be extracted from other data associated with the multimedia content. The generation can be performed when the query related to the multimedia content is received from a user. As an example, candidate generator 134 generates one or more query rewrite candidates 144 based on the extracted entities and one or more terms in a query provided by user 176. The query provided by user 176 may be related to multimedia content that the user may be consuming via the client computing device 190. In some implementations, the generation of query rewrite candidates 144 by candidate generator 134 can be performed when the query related to the multimedia content is received from user 176.

The one or more query rewrite candidates are provided to a search engine (block 406) and can be scored based on characteristics of respective result sets resulting from the providing (block 408). As an example, scoring and ranking engine 138 may provide one or more query rewrite candidates 144 to search engine 110. The scoring and ranking engine 138 may then score one or more query rewrite candidates 144 based on characteristics of respective result sets resulting from the providing query rewrite candidates 144 to the search engine 110.

The scored one or more query rewrite candidates can be ranked based on their respective scores (block 410). For example, a query rewrite candidate associated with a higher number of results may have a higher rank in comparison to another query rewrite candidate have a lower number of results. In another example, a query rewrite candidate associated with more diverse result (e.g., audio, video and text) set relative to the query rewrite candidate may have a higher rank in comparison to another query rewrite candidate having less diverse results (e.g., only text).

The query related to the multimedia content can be rewritten based on a particular ranked query rewrite candidate (block 412). As an example, query rewrite engine 140 may then rewrite the query related to the multimedia content based on a particular ranked query rewrite candidate. In some implementations, the particular ranked query rewrite candidate may be a highest ranked query rewrite candidate. For example, if a query provided by user 176 is "Which films has he acted in?," query rewrite engine 140 may automatically rewrite the query as "Which films has John Doe acted in." The rewritten query may then be provided by the query rewrite engine to search engine 110.

A result set from the search engine, based on the rewritten query, can be provided for display without interrupting consumption of the multimedia content (block 414). As an example, result manager 142 may provide for display, responsive to the query related to the multimedia content, a result set from search engine 110 based on the rewritten query. As an example, the result set may include names of films (e.g., "Deep Space, Galaxy Travel, Mysteries of Jupiter.") The result set may be provided by result manager 142 to user 176 in real-time as user 176 is consuming the multimedia content. The result set may be overlaid or displayed adjacent to the multimedia content as the user is consuming the multimedia content. The result set may be provided without interrupting the provision (e.g., streaming) of the multimedia content to user 176. User 176 may continue consuming the multimedia content and naturally ask questions at any time during the consumption. Thus, user 176 need not perform a search on a separate search engine and then further search through results from the search engine to identify a web page including answers to user 176's query regarding the multimedia content. In this way, user 176's attention need not be diverted from the multimedia content. This improves user experience.

Returning to FIG. 1, in certain aspects, server 180 may be implemented using hardware or a combination of software and hardware, either in a dedicated server, or integrated into another entity, or distributed across multiple entities.

Server 180 includes a bus 124 or other communication mechanism for communicating information, and processor 112 coupled with bus 124 for processing information. Processor 112 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Server 180 can include, in addition to hardware, code that creates an execution environment for the computer program in question, e.g., code that constitutes processor firmware, a protocol stack, a database management system, an operating system, or a combination of one or more of them stored in memory 120. Memory 120 may include Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 124 for storing information and instructions to be executed by processor 112. The processor 112 and the memory 120 can be supplemented by, or incorporated in, special purpose logic circuitry.

The instructions may be stored in the memory 120 and implemented in one or more computer program products, i.e., one or more modules of computer program instructions encoded on a computer readable medium for execution by, or to control the operation of, the server 180, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, embeddable languages, and xml-based languages. Memory 120 may also be used for storing temporary variable or other intermediate information during execution of instructions to be executed by processor 112.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Server 180 further includes a data storage device 126 such as a magnetic disk or optical disk, coupled to bus 124 for storing information and instructions. Server 180 may be coupled via input/output module 128 to various devices. The input/output module 128 can be any input/output module. Example input/output modules 128 include data ports such as USB ports. The input/output module 128 is configured to connect to a communications module 118. Example communications modules 118 (e.g., communications module 118 and 238) include networking interface cards, such as Ethernet cards and modems. In certain aspects, the input/output module 128 is configured to connect to a plurality of devices, such as an input device 116 and/or an output device 114. Example input devices 114 include a keyboard and a pointing device, e.g., a mouse or a trackball, by which a user can provide input to the server 180. Other kinds of input devices 114 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Example output devices 116 include display devices, such as a LED (light emitting diode), CRT (cathode ray tube), or LCD (liquid crystal display) screen, for displaying information to the user.

According to one aspect of the present disclosure, server 180 can be implemented using a server 180 in response to processor 112 executing one or more sequences of one or more instructions contained in memory 120. Such instructions may be read into memory 120 from another machine-readable medium, such as data storage device 126. Execution of the sequences of instructions contained in main memory 120 causes processor 112 to perform the process blocks described herein. One or more processors in a multi-processing arrangement may also be employed to execute the sequences of instructions contained in memory 120. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network (e.g., network 170) can include, for example, any one or more of a personal area network (PAN), a local area network (LAN), a campus area network (CAN), a metropolitan area network (MAN), a wide area network (WAN), a broadband network (BBN), the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Server 180 can be, for example, and without limitation, a desktop computer, laptop computer, or tablet computer. Server 180 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer readable medium" as used herein refers to any medium or media that participates in providing instructions or data to processor 112 for execution. Such a medium may take many forms, including, but not limited to, non-volatile media and volatile media. Non-volatile media include, for example, optical disks, magnetic disks, or flash memory, such as data storage device 126. Volatile media include dynamic memory, such as memory 120. Transmission media include coaxial cables, copper wire, and fiber optics, including the wires that comprise bus 124. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

Furthermore, to the extent that the term "include," "have," or the like is used in the description or the claims, such term is intended to be inclusive in a manner similar to the term "comprise" as "comprise" is interpreted when employed as a transitional word in a claim.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate aspects can also be implemented in combination in a single aspect. Conversely, various features that are described in the context of a single aspects can also be implemented in multiple aspects separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The subject matter of this specification has been described in terms of particular aspects, but other aspects can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

These and other implementations are within the scope of the following claims.

What is claimed is:

1. A method comprising:
    extracting entities associated with multimedia content, wherein the entities include values characterizing one or more objects represented in the multimedia content;
    receiving a query related to the multimedia content, the query including one or more terms, being in addition to the multimedia content, and being provided by a user during consumption of the multimedia content by the user;
    automatically generating, for rewriting the query related to the multimedia content, one or more query rewrite candidates based on the extracted entities and one or more of the terms in the query, wherein the generating is performed when the query related to the multimedia content is received from the user, and wherein generating the one or more query rewrite candidates comprises:
        scoring the one or more extracted entities based on one or more of: a time at which the extracted entities are annotated in the multimedia content or based on co-occurrences of n-grams in a query repository, the n-grams in the query repository each being a contiguous sequence of n items from a given sequence of text or speech, and the n-grams in the query repository including unigrams, bigrams, trigrams, and four-grams,
        ranking the extracted entities based on the scoring, and
        combining one or more of the terms of the query with one or more scored extracted entities to generate the one or more query rewrite candidates;

providing the one or more query rewrite candidates to a search engine;
scoring the one or more query rewrite candidates based on characteristics of respective result sets resulting from the providing;
ranking the scored one or more query rewrite candidates based on their respective scores;
rewriting the query related to the multimedia content based on a particular ranked query rewrite candidate; and
providing for display, responsive to the query related to the multimedia content, a result set from the search engine based on the rewritten query.

2. The method of claim 1, wherein scoring the one or more query rewrite candidates based on characteristics of respective result sets resulting from the providing, comprises:
determining a number of results in each of the result sets;
determining a relevance of the results in each of the result sets to the one or more terms in the query; and
determining diversity of the results in each of the result sets, wherein scores of each of the query rewrite candidates are based on one or more of the number, the relevance or the diversity.

3. The method of claim 1, wherein rewriting the query related to the multimedia content includes replacing the query with the particular ranked query rewrite candidate.

4. The method of claim 1, wherein the particular ranked candidate has a highest score relative to other ranked query rewrite candidates.

5. The method of claim 1, wherein the multimedia content is a streaming video.

6. The method of claim 1, wherein the objects include human or non-human representations appearing in the multimedia content.

7. The method of claim 1, wherein the values characterizing the one or more objects included in the multimedia content include a name or date associated with the objects.

8. The method of claim 1, wherein the extracting comprises:
reading metadata associated with the multimedia content, wherein the metadata includes user generated content.

9. The method of claim 1, wherein the scoring is based on a correspondence between the terms in the query and entities that are represented in the multimedia content at the time of the query.

10. The method of claim 1, wherein the multimedia content is a video and wherein extracting the entities comprises extracting at least one of the entities based on the at least one of the entities appearing in the video at a time of the query.

11. A non-transitory machine-readable medium comprising instructions stored therein, which when executed by a processor, causes the processor to perform operations comprising:
receiving a query related to multimedia content, the query including one or more terms, being in addition to the multimedia content, and being provided by a user during consumption of the multimedia content by the user;
identifying one or more terms in the query;
automatically generating, for rewriting the query related to the multimedia content, one or more query rewrite candidates based on entities associated with the multimedia content and the one or more terms in the query, wherein the entities include values characterizing one or more objects represented in the multimedia content, and wherein generating the one or more query rewrite candidates comprises:
scoring the one or more extracted entities based on one or more of: a time at which the extracted entities are annotated in the multimedia content or based on co-occurrences of n-grams in a query repository, the n-grams in the query repository each being a contiguous sequence of n items from a given sequence of text or speech, and the n-grams in the query repository including unigrams, bigrams, tri grams, and four-grams,
ranking the extracted entities based on the scoring, and
combining one or more of the terms of the query with one or more scored extracted entities to generate the one or more query rewrite candidates;
providing the one or more query rewrite candidates to a search engine;
scoring the one or more query rewrite candidates based on characteristics of respective result sets resulting from the providing;
ranking the scored one or more query rewrite candidates based on their respective scores;
rewriting the query related to the multimedia content based on a particular ranked query rewrite candidate; and
providing for display, responsive to the query related to the multimedia content, a result set from the search engine based on the rewritten query.

12. The non-transitory machine-readable medium of claim 11, wherein rewriting the query related to the multimedia content includes replacing the query with the particular ranked query rewrite candidate.

13. The non-transitory machine-readable medium of claim 11, wherein the particular ranked candidate has a highest score relative to other ranked query rewrite candidates.

14. The non-transitory machine-readable medium of claim 11, wherein the multimedia content is a streaming video.

15. The non-transitory machine-readable medium of claim 11, wherein the objects include human or non-human representations appearing in the multimedia content.

16. The non-transitory machine-readable medium of claim 11, wherein the values characterizing the one or more objects included in the multimedia content include a name or date associated with the objects.

17. The non-transitory machine-readable medium of claim 11, wherein the scoring is based on a correspondence between the terms in the query and entities that are represented in the multimedia content at the time of the query.

18. A system comprising:
a memory comprising instructions; and
a processor configured to execute the instructions to:
receive a query related to streaming multimedia content, wherein the query includes one or more terms and is provided by a user through voice input during consumption of the streaming multimedia content by the user;
automatically generate, for rewriting the query related to the streaming multimedia content, one or more query rewrite candidates based on entities associated with the multimedia content and the one or more terms in the query, wherein the entities include values characterizing one or more objects represented in the multimedia content wherein in executing the instructions to generate the one or more query rewrite candidates, the processor is further to:

score the one or more extracted entities based on one or more of: a time at which the extracted entities are annotated in the multimedia content or based on co-occurrences of n-grams in a query repository, the n-grams in the query repository each being a contiguous sequence of n items from a given sequence of text or speech, and the n-grams in the query repository including unigrams, bigrams, tri grams, and four-grams, rank the extracted entities based on the scoring, and combine one or more of the terms of the query with one or more scored extracted entities to generate the one or more query rewrite candidates;

provide the one or more query rewrite candidates to a search engine;

score the one or more query rewrite candidates based on characteristics of respective result sets resulting from the providing;

rank the scored one or more query rewrite candidates based on their respective scores;

rewrite the query related to the multimedia content based on a particular ranked query rewrite candidate; and provide, without interrupting consumption of the multimedia content, a result set from the search engine based on the rewritten query.

19. The system of claim 18, wherein the rewrite of the query related to the multimedia content includes replacing the query with the particular ranked query rewrite candidate.

20. The system of claim 18, wherein the particular ranked candidate has a highest score relative to other ranked query rewrite candidates.

* * * * *